(12) United States Patent
Chiang et al.

(10) Patent No.: US 9,606,290 B2
(45) Date of Patent: Mar. 28, 2017

(54) BACKLIGHT MODULE AND DISPLAY DEVICE COMPRISING THE SAME HAVING ENGAGING CONVEX AND CONCAVE POSITIONING ELEMENTS

(71) Applicant: InnoLux Corporation, Miao-Li County (TW)

(72) Inventors: Chi-Hsiang Chiang, Miao-Li County (TW); I-Jan Wang, Miao-Li County (TW)

(73) Assignee: INNOLUX CORPORATION (TW)

( * ) Notice: Subject to any disclaimer, the term of this patent is extended or adjusted under 35 U.S.C. 154(b) by 70 days.

(21) Appl. No.: 14/606,074

(22) Filed: Jan. 27, 2015

(65) Prior Publication Data

US 2015/0212262 A1 Jul. 30, 2015

(30) Foreign Application Priority Data

Jan. 29, 2014 (TW) .............................. 103103561 A

(51) Int. Cl.
*F21V 8/00* (2006.01)

(52) U.S. Cl.
CPC .......... *G02B 6/0093* (2013.01); *G02B 6/0088* (2013.01)

(58) Field of Classification Search
CPC ............................ G02B 6/0088; G02B 6/0093
USPC ................................................ 362/632–634
See application file for complete search history.

(56) References Cited

U.S. PATENT DOCUMENTS

| 7,969,525 | B2* | 6/2011 | Watanabe | G02B 6/0021 349/58 |
| 8,740,446 | B2* | 6/2014 | Huang | G02B 6/0088 362/632 |
| 8,770,818 | B2* | 7/2014 | Huang | G02B 6/0088 362/611 |
| 8,801,257 | B2* | 8/2014 | Ishimoto | G02B 6/0088 349/58 |
| 2008/0111940 | A1 | 5/2008 | Chang | |
| 2013/0135901 | A1* | 5/2013 | Ishimoto | G02B 6/24 362/617 |

FOREIGN PATENT DOCUMENTS

| CN | 101315493 A | 12/2008 | |
| CN | 102376203 A | 3/2012 | |
| CN | 203147502 U | 8/2013 | |
| JP | WO 2012020592 A1 * | 2/2012 | ........... G02B 6/0088 |
| JP | 2012164507 A | 8/2012 | |
| TW | 201248262 A | 12/2012 | |
| TW | 201400925 A | 1/2014 | |
| TW | 201400926 A | 1/2014 | |

* cited by examiner

*Primary Examiner* — Robert May
(74) *Attorney, Agent, or Firm* — Bacon & Thomas, PLLC

(57) ABSTRACT

The present invention relates to a backlight module, comprising: a backboard having at least a positioning convex part protruding from a surface of the backboard; a light guiding plate arranged on the backboard, having a light-near side and a light-far side disposed opposite to each other, and two connecting sides disposed opposite to each other; a light source disposed near the light-near side of the light guiding plate; and at least a buffer element interposed between the light-far side of the light guiding plate and the backboard, and the buffer element abuts against the light-far side.

8 Claims, 6 Drawing Sheets

BACKLIGHT MODULE AND DISPLAY DEVICE COMPRISING THE SAME HAVING ENGAGING CONVEX AND CONCAVE POSITIONING ELEMENTS

CROSS REFERENCE TO RELATED APPLICATION

This application claims the benefits of the Taiwan Patent Application Ser. No. 103103561, filed on Jan. 29, 2014, the subject matter of which is incorporated herein by reference.

BACKGROUND OF THE INVENTION

1. Field of the Invention

The present invention relates to a backlight module, and especially to a backlight module having a positioning structure for a light guide plate, and a display comprising the same.

2. Description of Related Art

With the development trend of miniaturization and lightweight of electronic device, the volume of backlight module in a display is adapted to this trend. A backlight module is an indispensable element of a display device, usually composed of a backboard, a light guide plate, a light source and multiple optical films, to scattering light evenly.

In the current backlight module, the light guide plate is typically engaged with a backboard or plastic frame, or arranged on the backboard by a copper pillar. The light guide is susceptible to thermal deformation due to its thermal expansion property, thereby detrimentally affecting the light guide effect of the light guide plate. In order to avoid damage of the light guide plate due to thermal expansion, a sufficient space around the light guide plate is usually reserved for its expansion and contraction. However, this can result in an undesirably long distance between the light guide plate and the light source, which reduces the light entrance efficiency, and thereby increases the brightness variability of the backlight module.

The distance between the light source and the light guide plate can be reduced to improve the light entrance efficiency, but with reduction of the space for expansion and contraction, the light source is under the risk of being crushed by the light guide plate. Also, the thermal expansion of the light guide plate will probably cause a large amount of displacement of the light guide plate, resulting in scratch of the light guide plate or pressing the glass to bulge outward to deform the optical layer, thereby causing top white light leakage and bad aesthetic.

In view of the above problems, what is needed is to develop a backlight module, which not only can effectively position the light guide plate, but also can control the expansion and contraction of the light guide plate without affecting the light entrance efficiency, to avoid damage to the backlight module.

SUMMARY OF THE INVENTION

To solve the above problem, an object of the present invention is to provide a backlight module having a special positioning structure for a light guide plate, to maintain the positioning function and the light entrance efficiency during thermal expansion, and a buffer material is employed to limit the displacement of the light guide plate by absorbing deformation due to the expansion of the light guide plate.

To achieve the above object, the present invention provides a backlight module, comprising: a backboard having at least a positioning convex part protruding from a surface of the backboard; a light guiding plate arranged on the backboard, having a light-near side and a light-far side disposed opposite to each other, and two connecting sides disposed opposite to each other, wherein two ends of each connecting side are connected to the light-near side and the light-far side respectively, and at least one of the connecting sides has at least a concave portion disposed corresponding to the positioning convex part of the backboard, and the concave portion has a first side near the light-near side and a second side near the light-far side; a light source disposed near the light-near side of the light guiding plate; and at least a buffer element interposed between the light-far side of the light guiding plate and the backboard, and the buffer element abuts against the light-far side, wherein when the positioning convex part is engaged with the concave portion, the positioning convex part and the first side of the concave portion are spaced apart by a first distance, and the positioning convex part and the second side of the concave portion are spaced apart by a second distance, wherein the first distance is larger than the second distance.

The present invention further provides a backlight module, comprising: a backboard having at least a positioning concave portion; a light guiding plate arranged on the backboard, having a light-near side and a light-far side disposed opposite to each other, and two connecting sides disposed opposite to each other, wherein two ends of each connecting side are connected to the light-near side and the light-far side respectively, and at least one of the connecting sides has at least a convex disposed corresponding to the positioning concave portion; a light source disposed near the light-near side of the light guiding plate; and at least a buffer element interposed between the light-far side of the light guiding plate and the backboard, and the buffer element abuts against the light-far side, wherein the positioning concave portion has a third side near the light-near side and a fourth side near the light-far side, and the convex is engaged with the positioning concave portion and located near the third side.

Furthermore, the present invention also provides a display, comprising: a display panel; and the above-mentioned backlight module of the present invention disposed at a side of the display panel.

DETAILED DESCRIPTION OF THE PREFERRED EMBODIMENT

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention, and those skilled in the art will appreciate that various modifications, additions and substitutions are possible.

Figure 1:
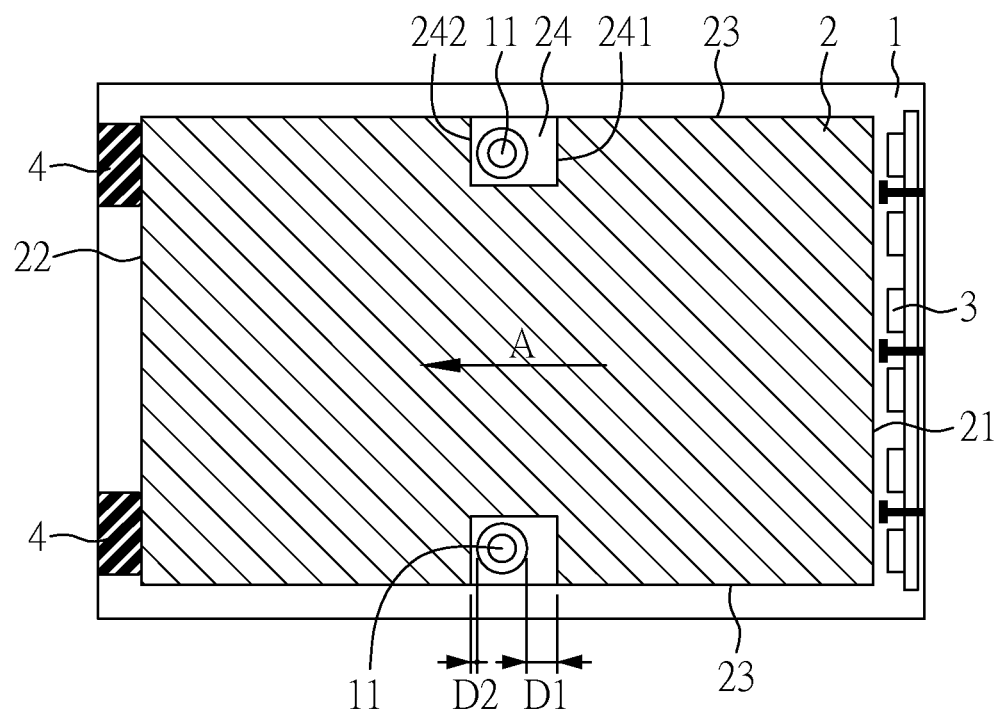
FIG. 1 shows a schematic diagram of the backlight module according to the embodiment 1 of the present invention.

FIG. 1 shows a schematic diagram of the backlight module according to the embodiment 1 of the present invention, which comprises: a backboard 1, a light guide plate 2, a light source 3, and at least a buffer element 4.

In detail, the backboard 1 has at least a positioning convex part 11. In the present embodiment, two positioning convex parts 11 are used for illustrative purposes, and the positioning convex parts 11 protrude from a surface of the backboard 1. The light guide plate 2 is disposed on the backboard 1, and the light guide plate 2 has a light-near side 21 and a light-far side 22 parallel with each other, and two connecting sides 23 parallel with each other, wherein two ends of each connecting side 23 are connected to the light-near side 21 and the light-far side 22 respectively, and at least one of the connecting sides 23 has at least a concave portion 24 disposed at positions corresponding to the positioning convex part 11 of the backboard 1. Preferably, each of the two second connecting sides 23 is provided with a concave portion 24, and the positions of the concave portions 24 are symmetrical to each other. Each of the concave portions 24 has a first side 241 near the light-near side 21 and a second side 242 near the light-far side 22. The positioning convex part 11 is disposed at the concave portion 24 of the light guide plate 2 and near the second side 242.

The light source 3 is disposed at the backboard 1 and located on the light-near side 21 of the light guide plate 2. In general, the light source 3 is composed of an LED strip lamp to provide lighting from the light-near side 21 to the light guide plate 2.

The buffer element 4 is interposed between the light-far side 21 of the light guide plate 22 and the backboard 1, and the buffer element abuts against the light-far side 22. In this embodiment, two buffer elements are used for illustrative purposes.

To achieve a better fixation to the light guide plate 2 of the backlight module 2 of the present embodiment 1, when the positioning convex part 11 is engaged with the corresponding concave portion 24, the positioning convex part 11 and the first side 241 are spaced apart by a first distance D1, and the positioning convex part 11 and the second side 242 are spaced apart by a second distance D2, wherein the first distance D1 is larger than the second distance D2, and the first distance D1 covers the length variation due to expansion and contraction of the light guide plate 2 along the direction A (i.e. the direction from the light-near side 21 to the light-far side 22). Preferably, the first distance D1 is 0.4% to 1% of length of one of the connecting sides 23 of the light guiding plate 2, and the second distance D2 is close to zero, that is, the positioning convex part 11 abuts against the second side 242. In such a case, the light guide plate 2 is more likely to expand along the direction A upon heating, while the displacement of the light guide plate 2 along the direction A or along a direction vertical to the direction A is also under good control.

Figure 2:
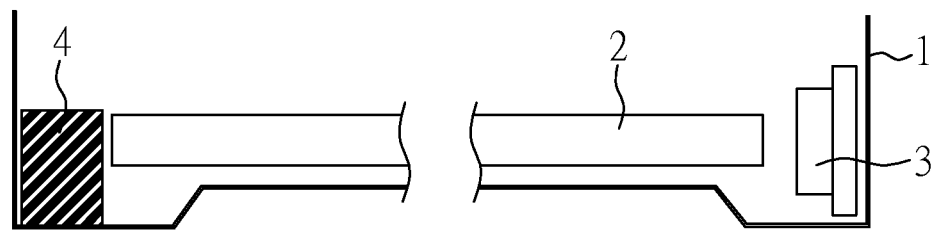
FIGS. 2 to 4 show schematic diagrams of the buffer element of the backlight module according to an embodiment of the present invention.
Figure 3:
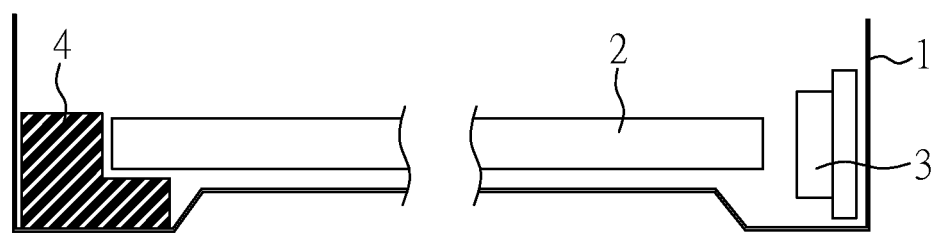
Figure 4:
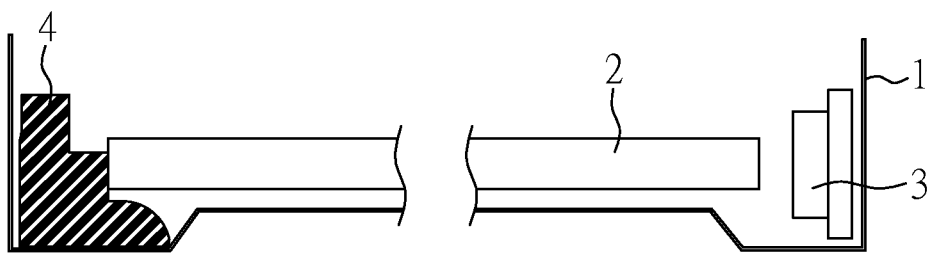

FIGS. 2 to 4 show schematic diagrams of the buffer element of the backlight module according to an embodiment of the present invention. The buffer element 4 of the present invention abuts against the light-far side 22 of the light guide plate 2, to absorb the expanding length of the light guide plate 2, to avoid the deformation of the light guide plate 2 or causing the glass to bulge outward. The buffer element 4 of the present invention may comprise an elastic material, such as an elastic rubber material. The shape of the buffer element made of the elastic material is not particularly limited, and for example, it may be a rectangular buffer element as shown in FIG. 4, a L-shaped buffer element as shown in FIG. 3, a trapezoidal buffer element as shown in FIG. 4, and so on. Taking the trapezoidal buffer element 4 as shown in FIG. 4 as an example, when the light guide plate 2 expands along the direction of the buffer element (i.e. the direction A of FIG. 1), the light guide plate 2 may further spring up to a next ladder along the buffer element 5, which is used as the ladder, to buffer the expansion of the light guide plate.

Figure 5:
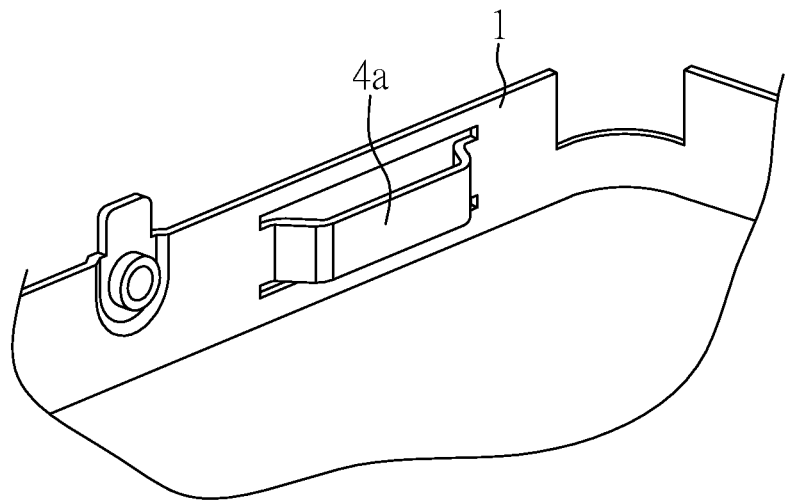
FIGS. 5 to 6 show schematic diagrams of another buffer element of the backlight module according to the embodiment 1 of the present invention.
Figure 6:
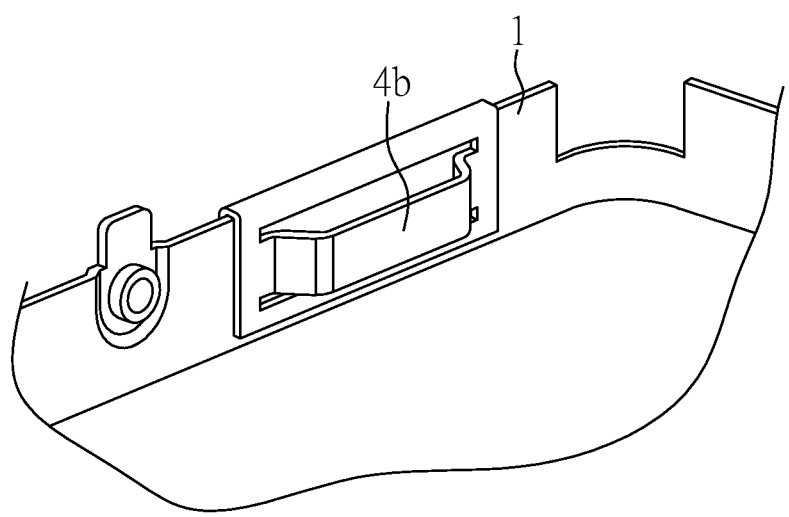

In addition, FIGS. 5 to 6 show schematic diagrams of another buffer element of the backlight module according to the embodiment 1 of the present invention. In addition to the elastic material, the buffer element 4 of the present invention may also be a shrapnel, and the shrapnel may be a shrapnel buffer element 4a formed integrally with a backboard 1 (as shown in FIG. 5), or a shrapnel buffer element 4b additionally attached to the backboard 1 (as shown in FIG. 6).

Furthermore, the above light source can be any light source, such as a light emitting diode, etc., and is not particularly limited. The material of the backboard is also not particularly limited. and may be a metal backboard. The material of the positioning convex part is also not particularly limited, and may be a copper positioning pillar. The light guide plate may be a conventional light guide plate.

Figure 7:
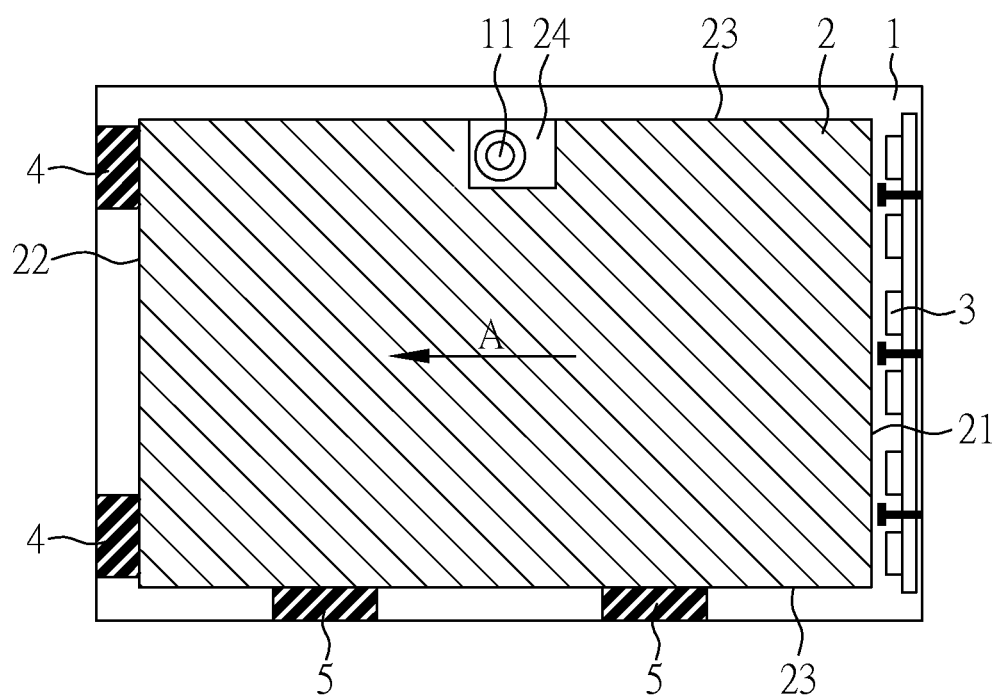
FIG. 7 shows a schematic diagram of another backlight module according to the embodiment 1 of the present invention.

In addition to the above illustrated backlight module, a schematic diagram of another backlight module according to the embodiment 1 of the present invention is shown in FIG. 7. The structure in FIG. 7 is substantially the same as in FIG. 1, except that the backlight module in FIG. 7 further comprises at least a stopper 5, and only one of the connecting sides 23 of the light guide plate 2 has the concave portion 24, while the other side 23 of the light guide plate 2 abuts against the stopper 5. In this embodiment, two stoppers 5 are provided and interposed between the light guide plate 2 and the backboard 1. The material of the stopper applied in the present invention may have elasticity to fix the light guide plate 2, thereby preventing the displacement of the light guide plate 2 along a direction vertical to the direction A in the backlight module.

Figure 8:
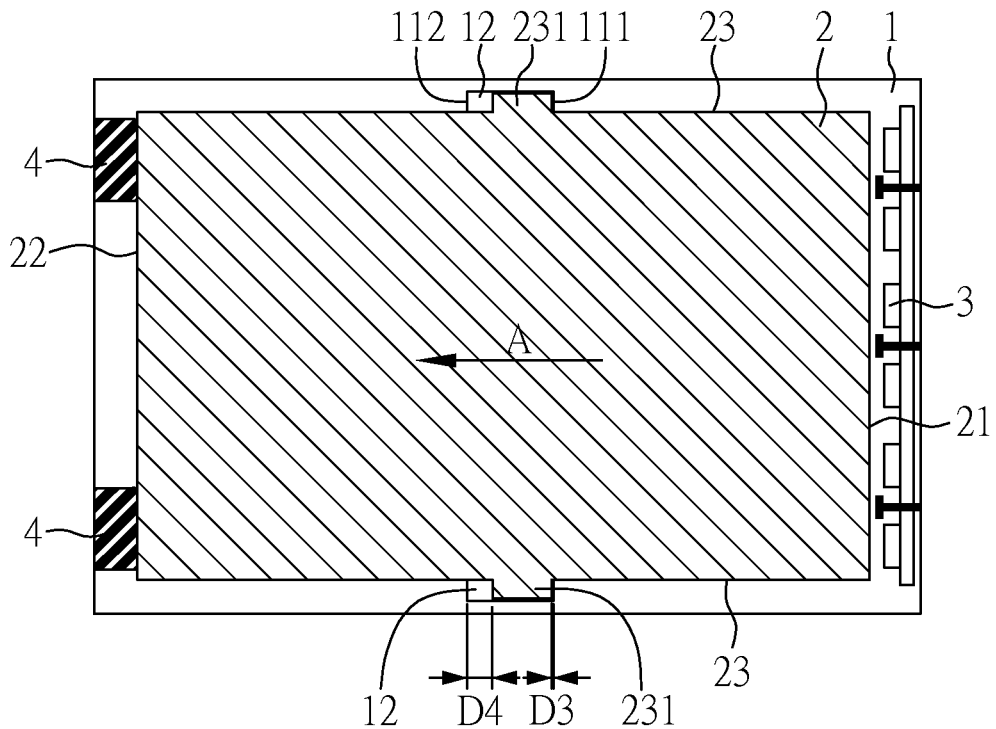
FIG. 8 shows a schematic diagram of a further backlight module according to an embodiment of the present invention.

In addition to the above illustrated backlight module, a schematic diagram of a further backlight module according to an embodiment of the present invention is shown in FIG. 8. The backlight module in FIG. 8 comprises: a backboard 1, a light guide plate 2, light source 3, and at least a buffer element 4.

The backboard 1 has at least a positioning concave portion 12, and two positioning concave portions 12 are used in this embodiment 2, wherein the light guide plate 2 is disposed on the backboard 1, and has a light-near side 21 and a light-far side 22 disposed opposite and parallel to each other, and two connecting sides 23 disposed opposite to each other, wherein two ends of each connecting side 23 are connected to the light-near side 21 and the light-far side 22 respectively, and at least one of the connecting sides 23 has at least a convex 231 disposed at positions corresponding to the positioning concave portion 12. The light source 3 is disposed at the backboard 1 and located on the light-near side 21 of the light guiding plate 2. The buffer element 4 is interposed between the light-far side 22 of the light guiding plate 2 and the backboard 1, and the buffer element abuts against the light-far side 22 of the light guiding plate 2.

Specifically, each of the connecting sides 23 of the light guide plate 2 is provided with a convex 231, and the convexes 231 are disposed symmetrical to each other. The positioning concave portion 12 has a third side 111 near the light-near side 21 and a fourth side 112 near the light-far side 22, and when the convexes 231 are engaged with the positioning concave portions 12, the convexes 231 are located near the third side 111. Accordingly, the thermal expansion of the light guide plate 2 can be controlled to be more likely along the direction A.

Each of the convexes 231 and the third side 111 are spaced apart by a third distance D3, and each of the convexes 231 and the fourth side 112 are spaced apart by a fourth distance D4, wherein the third distance D3 is smaller than the fourth distance D4. Preferably, the fourth distance D4 is 0.4% to 1% of length of one of the connecting sides 23 of the light guiding plate 2, and the third distance D3 is close to zero. That is, the concave portions 231 abut against the third side 111 of the corresponding positioning concave portion 12. Accordingly, the light guide plate 2 is more likely to expand along the direction A upon heating, while the displacement of the light guide plate 2 in the direction A or in a direction vertical to the direction A is also under good control.

The characteristics and conditions of the buffering material of the backlight module in FIG. 8 are the same as that in FIG. 1, and may be an elastic material or a shrapnel. The shape of the buffer element may be selected from the group consisting of: a rectangular shape, a L-shape, a ladder-shape and a combinations thereof, and is not particularly limited. The shrapnel may extend from and be formed integrally with a backboard 1, or may be a shrapnel additionally attached to the backboard 1, and is not particularly limited.

Figure 9:
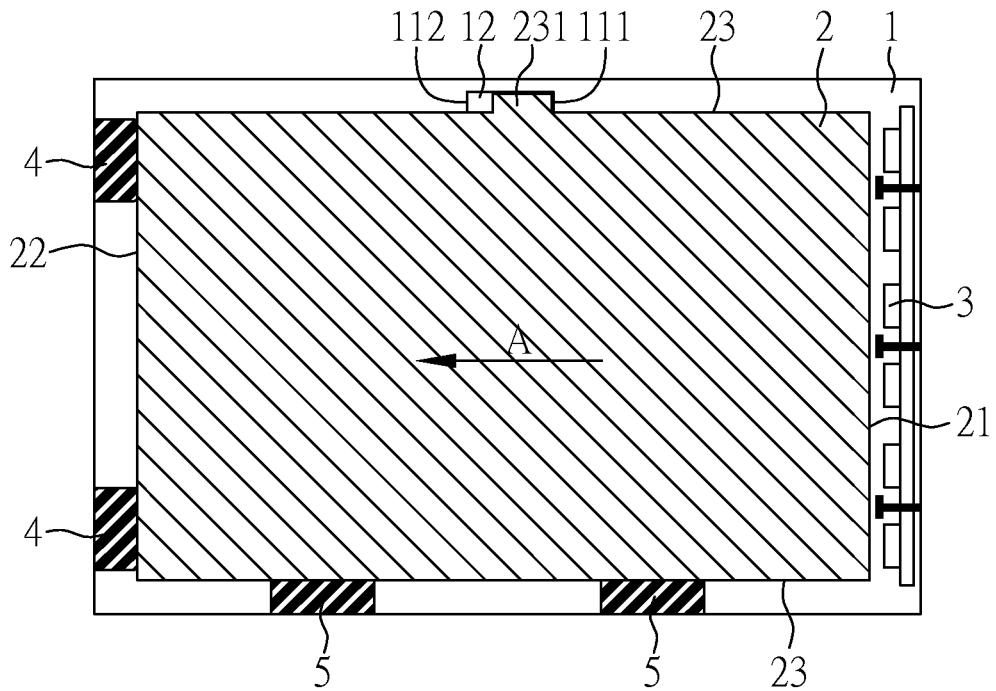
FIG. 9 shows a schematic diagram of another backlight module according to the embodiment 2 of the present invention.

FIG. 9 shows a schematic diagram of another backlight module according to the embodiment 2 of the present invention. The present embodiment is substantially the same as FIG. 8, except that the backlight module further comprises at least a stopper 5, and only one of the connecting sides 23 of the light guide plate 2 is provided with the convex 231. In the present embodiment, one of the connecting sides 23 of the light guide plate 2 is provided with the convex 231, while the other side 23 of the light guide plate 2 abuts against two stoppers 5. In this embodiment, fixation and positioning functions of the light guide plate 2 can also be achieved.

Figure 10:
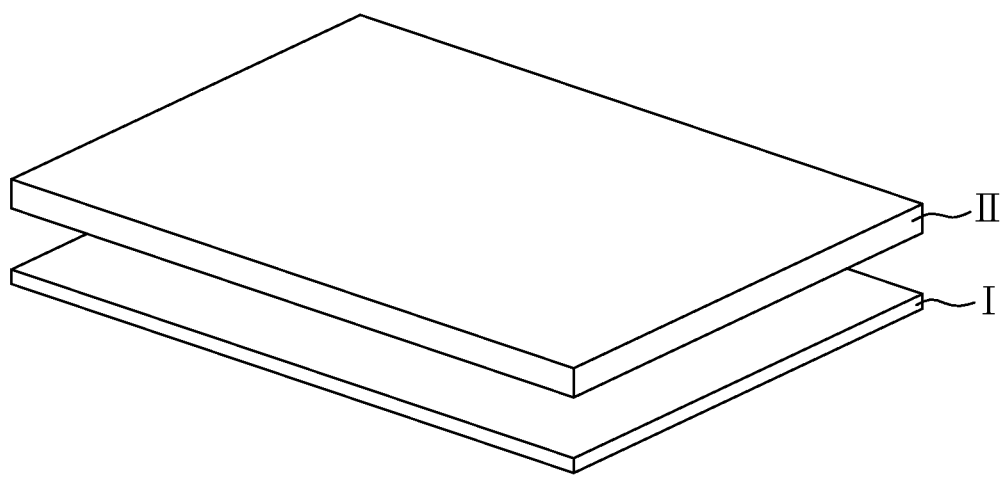
FIG. 10 shows a schematic diagram of the display according to an embodiment of the present invention.

In addition to the above illustrated backlight module, the present invention also provides an embodiment of a display as shown in FIG. 10, wherein the display comprises a display panel II; and the backlight module I of the present invention disposed on the display panel II, and the backlight module I may be any backlight module of the above embodiments.

While the invention has been shown and described with reference to certain exemplary embodiments thereof, it will be understood by those skilled in the art that various changes in form and details may be made therein without departing from the scope of the invention as defined by the appended claims.

What is claimed is:

1. A backlight module, comprising:
   a backboard having at least a positioning convex part protruding from a surface of the backboard;
   a light guiding plate arranged on the backboard, having a light-near side and a light-far side disposed opposite to each other, and two connecting sides disposed opposite to each other, wherein two ends of each connecting side are connected to the light-near side and the light-far side respectively, and at least one of the connecting sides has at least a concave portion disposed corresponding to the positioning convex part of the backboard, and the concave portion has a first side near the light-near side and a second side near the light-far side;
   a light source disposed near the light-near side of the light guiding plate; and
   at least a buffer element interposed between the light-far side of the light guiding plate and the backboard, and the buffer element abuts against the light-far side,
   wherein when the positioning convex part is engaged with the concave portion, the positioning convex part and the first side of the concave portion are spaced apart by a first distance, and the positioning convex part and the second side of the concave portion are spaced apart by a second distance, wherein the first distance is larger than the second distance;
   wherein the first distance is 0.4% to 1% of length of one of the connecting sides of the light guiding plate, and the second distance is close to zero.

2. The backlight module of claim 1, wherein each of the connecting sides of the light guide plate has a concave portion.

3. The backlight module of claim 1, further comprising at least a stopper interposed between the light guide plate and the backboard, wherein the concave portion is disposed at one of the connecting sides of the light guide plate, and another connecting side of the light guide abuts against the stopper.

4. The backlight module of claim 1, wherein the buffer element comprises an elastic material or a shrapnel.

5. A backlight module, comprising:
   a backboard having at least a positioning concave portion;
   a light guiding plate arranged on the backboard, having a light-near side and a light-far side disposed opposite to each other, and two connecting sides disposed opposite to each other, wherein two ends of each connecting side are connected to the light-near side and the light-far side respectively, and at least one of the connecting sides has at least a convex part disposed corresponding to the positioning concave portion;
   a light source disposed near the light-near side of the light guiding plate; and
   at least a buffer element interposed between the light-far side of the light guiding plate and the backboard, and the buffer element abuts against the light-far side,
   wherein the positioning concave portion has a third side near the light-near side and a fourth side near the light-far side, and the convex part is engaged with the positioning concave portion and located near the third side;
   wherein the convex part and the third side are spaced apart by a third distance, and the convex part and the fourth side are spaced apart by a fourth distance, wherein the third distance is smaller than the fourth distance, and the fourth distance is 0.4% to 1% of length of one of the connecting sides of the light guiding plate.

6. The backlight module of claim 5, wherein each of the connecting sides of the light guide plate has a convex part.

7. The backlight module of claim 5, further comprising at least a stopper interposed between the light guide plate and the backboard, wherein the convex part of the light guide plate is disposed at one of the connecting sides of the light guide plate, and another connecting side of the light guide abuts against the stopper, wherein the stopper and the buffer element comprise an elastic material or a shrapnel.

8. A display device, comprising:
   a display panel; and
   the backlight module of any of claims 1, 2-5, 6, 7 disposed at a side of the display panel.

* * * * *